(12) United States Patent
Mudd et al.

(10) Patent No.: US 8,376,312 B2
(45) Date of Patent: *Feb. 19, 2013

(54) FLOW RESTRICTOR

(75) Inventors: Daniel T Mudd, Sparks, NV (US);
William W White, Sparks, NV (US);
Virginia Miller, Sparks, NV (US);
Christopher Davis, Richardson, TX
(US); Kimura Miyoshi, Koyoto (JP);
Tadahiro Yasuda, Koyoto (JP)

(73) Assignee: Horiba, Ltd., Kyoto (JP)

( * ) Notice: Subject to any disclaimer, the term of this patent is extended or adjusted under 35 U.S.C. 154(b) by 159 days.

This patent is subject to a terminal disclaimer.

(21) Appl. No.: 11/932,429

(22) Filed: Oct. 31, 2007

(65) Prior Publication Data

US 2008/0041481 A1    Feb. 21, 2008

Related U.S. Application Data

(63) Continuation of application No. 11/063,745, filed on Feb. 24, 2005, now Pat. No. 7,431,045, which is a continuation-in-part of application No. 11/652,506, filed on Aug. 28, 2003, now abandoned.

(60) Provisional application No. 60/548,109, filed on Feb. 27, 2004.

(51) Int. Cl.
*F16L 55/027* (2006.01)
(52) U.S. Cl. .......... 251/127; 138/40; 138/42; 73/861.52
(58) Field of Classification Search .............. 137/487.5;
138/40, 42; 251/127; 73/861.52
See application file for complete search history.

(56) References Cited

U.S. PATENT DOCUMENTS

| | | | |
|---|---|---|---|
| 3,404,264 A | | 10/1968 | Kugler |
| 3,851,526 A | * | 12/1974 | Drexel .......................... 138/42 |
| 3,856,049 A | | 12/1974 | Scull |
| 3,899,001 A | | 8/1975 | Orme |
| 3,942,951 A | * | 3/1976 | Atoiants et al. ................. 138/45 |
| 4,419,898 A | | 12/1983 | Zanker et al. |
| 4,427,030 A | | 1/1984 | Jouwsma |
| 4,450,718 A | | 5/1984 | Hartemink |
| 4,497,202 A | * | 2/1985 | Mermelstein ................... 138/42 |
| 4,562,744 A | | 1/1986 | Hall et al. |
| 5,357,793 A | | 10/1994 | Jouwsma |
| 5,672,821 A | | 9/1997 | Suzuki |
| 5,687,763 A | | 11/1997 | Steinke |
| 5,769,122 A | * | 6/1998 | Baumann et al. ........ 137/625.33 |
| 5,868,159 A | | 2/1999 | Loan et al. |
| 6,152,162 A | | 11/2000 | Balazy et al. |
| 6,161,584 A | | 12/2000 | Hemme et al. |
| 6,510,746 B1 | | 1/2003 | Kotwicki |
| 6,615,874 B2 | * | 9/2003 | Thurston et al. ................ 138/42 |
| 6,701,957 B2 | * | 3/2004 | McCarty et al. ................ 138/42 |
| 6,964,279 B2 | | 11/2005 | Ohmi et al. |
| 7,431,045 B2 | * | 10/2008 | Mudd et al. ................. 137/487.5 |
| 7,690,400 B2 | * | 4/2010 | Haines ............................ 138/42 |
| 2005/0016604 A1 | | 1/2005 | Steinke et al. |

OTHER PUBLICATIONS

European Office Action dated May 17, 2010.
Chinese Office Action, Dated Apr. 26, 2010.
Trial Decision with a Partial English Translation dated Sep. 26, 2012.

* cited by examiner

*Primary Examiner* — Kevin Lee
(74) *Attorney, Agent, or Firm* — Sughrue Mion, PLLC

(57) ABSTRACT

A flow restrictor with a first disk having at least one inlet and at least one outlet and a flow path and a second disk having no flow path. The first disk and the second disk being stacked together.
A mass flow controller comprising with an input, an output, a flow path, a pressure transducer and the above flow restrictor.

13 Claims, 16 Drawing Sheets

| CONFIG. NUMBER | SCCM@FS 800 TORR | SCCM@FS 270 TORR | NUMBER OF DISKS | NUMBER OF FLOW PATHS | RESTRICTOR THICKNESS |
| --- | --- | --- | --- | --- | --- |
| 1 | 38 | 4 | 8 | 1 | 0.076" |
| 1.5 | 100 | 10 | 8 | 3 | 0.076 |
| 2 | 300 | 35 | 8 | 8 | 0.076 |
| 2.5 | 900 | 100 | 8 | 24 | 0.076 |
| 3 | 2,500 | 300 | 8 | 66 | 0.076 |
| 4 | 10,000 | 1,100 | 26 | 264 | 0.076 |
| 5 | 20,000 | 2,500 | 15 | 120 | 0.076 |
| 6 | 80,000 | 10,000 | 42 | 480 | 0.126 |

FIG. 5

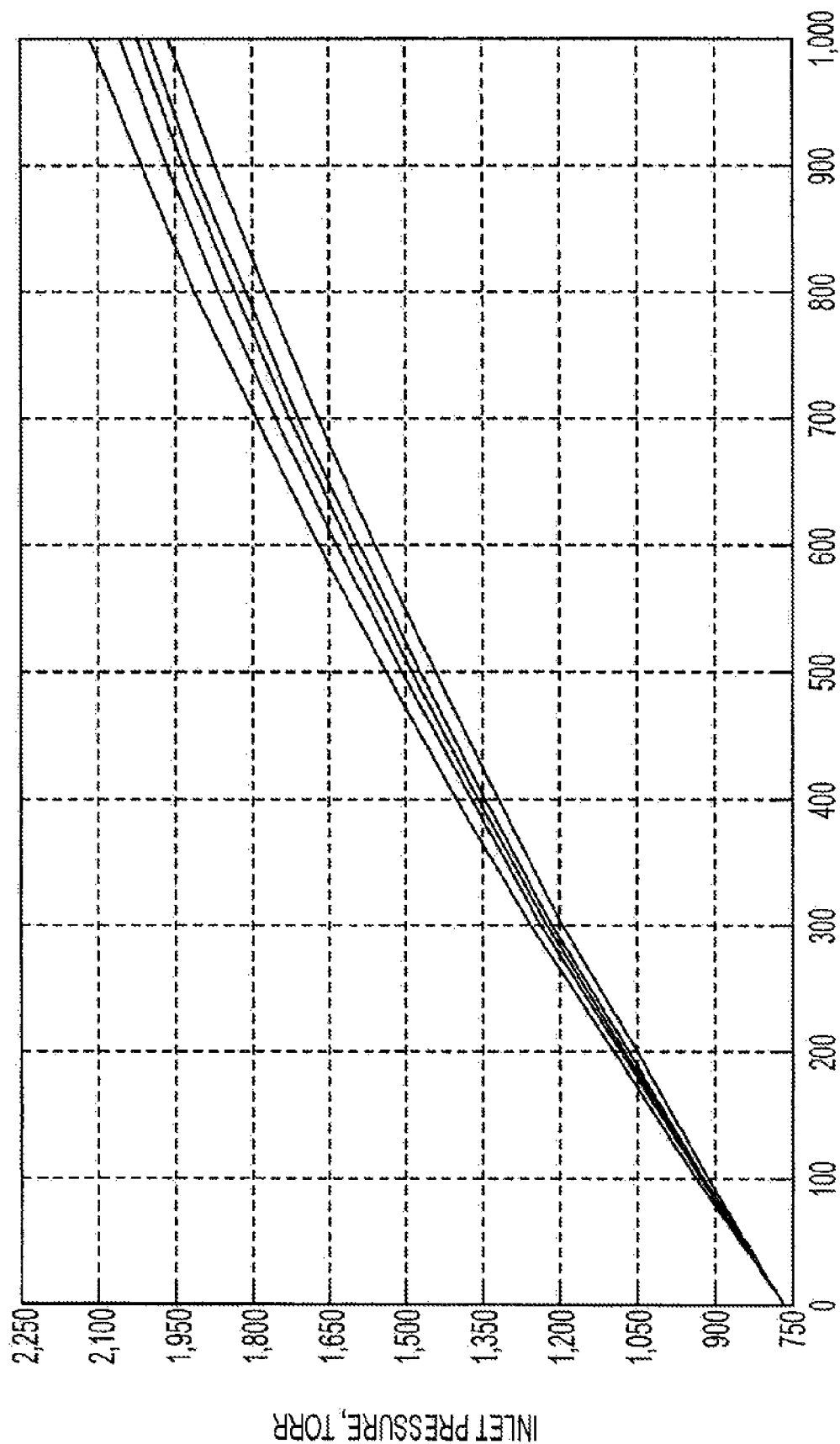

| RESTRICTOR CONFIGURATION 3.0 2.5 SLM N2 @ 800 TORR | | |
|---|---|---|
| 3 DISK 66 PATHS | CMBR PRESS TORR | EST FLOW SCCM, AIR |
| 21 | 101.96 | 1,552.3 |
| 22 | 107.84 | 1,661.7 |
| 23 | 101.1 | 1,536.5 |
| 24 | 107.45 | 1,654.3 |
| 25 | 106.9 | 1,644.0 |
| 26 | 107.98 | 1,664.3 |
| 27 | 108.59 | 1,675.8 |
| 28 | 109.49 | 1,692.8 |
| 29 | 108.95 | 1,682.6 |
| 210 | 105.3 | 1,614.1 |
| 211 | 107.96 | 1,663.9 |
| 212 | 105.6 | 1,619.7 |
| 213 | 99.53 | 1,507.2 |
| 214 | 99.55 | 1,508.2 |
| AVG FLOW | | 1,619.9 |
| STD DEV | | 63.46 |

| RESTRICTOR CONFIGURATION 2.5 900 SCCM N2 @ 800 TORR | | |
|---|---|---|
| 3 DISK 24 PATHS | CMBR PRESS TORR | EST FLOW SCCM, AIR |
| 31 DUSTED | 31.35 | 422.2 |
| 32 | 38.58 | 522.4 |
| 33 | 38.45 | 520.6 |
| 34 | 39.1 | 529.8 |
| 35 | 39.1 | 529.8 |
| 36 | 40.31 | 546.9 |
| 37 | 40.6 | 551.0 |
| 38 | 36.46 | 492.7 |
| 39 | 41.79 | 568.0 |
| 310 | 43.46 | 592.0 |
| 311 | 40.9 | 555.3 |
| 312 | 40.89 | 555.2 |
| 313 | 40.08 | 543.6 |
| 314 | 37.84 | 512.0 |
| AVG FLOW | | 539.9 |
| STD DEV | | 24.90 |

| RESTRICTOR CONFIGURATION 2.0 300 SCCM N2 @ 800 TORR | | |
|---|---|---|
| 1 DISK 8 PATHS | CMBR PRESS TORR | EST FLOW SCCM, AIR |
| 11 | 9.37 | 139.4 |
| 12 | 9.57 | 141.8 |
| 13 | 8.81 | 132.6 |
| 14 | 9.43 | 140.1 |
| 15 | 10.08 | 148.0 |
| 16 | 9.05 | 135.5 |
| 17 | 10.02 | 147.3 |
| 18 | 10.22 | 149.7 |
| 19 | 10.09 | 148.1 |
| 110 | 9.42 | 140.0 |
| 111 | 8.76 | 132.0 |
| 112 | 10.23 | 149.8 |
| 113 | 8.29 | 126.3 |
| 114 | 8.85 | 133.1 |
| AVG FLOW | | 140.3 |
| STD DEV | | 7.32 |

FIG. 12A

| STYLE C1.0 RESTRICTOR D.U.T. | MEASURED AIR FLOW SCCM | FIXED INLET PRESS TORR | TEMP C | STYLE C1.5 RESTRICTOR D.U.T. | MEASURED AIR FLOW SCCM | FIXED INLET PRESS TORR | TEMP C | STYLE C1.5 RESTRICTOR D.U.T. | FIXED N2 FLOW SCCM | MEASURED INLET PRESS TORR | TEMP C |
|---|---|---|---|---|---|---|---|---|---|---|---|
| 41 | 25.74 | 630.1 | 23.4 | 51 | 62.92 | 590.4 | 23.1 | 61 | 2,492.5 | 318 | 22.8 |
| 42 | 26.8 | 629.1 | | 52 | 62.41 | 590.9 | | 62 | 2,492.6 | 317 | |
| 43 | 26.2 | 629.7 | | 53 | 62.66 | 590.6 | | 63 | 2,484.8 | 313 | |
| 44 | 25.06 | 631.0 | | 54 | 65.24 | 587.7 | | 65 | 2,491.8 | 318 | |
| 45 | 26.75 | 629.2 | | 55 | 65.3 | 587.7 | | 67 | 2,492.2 | 321 | |
| 46 | 25.67 | 630.4 | | 56 | 66.23 | 586.8 | | 68 | 2,492.4 | 320 | |
| 47 | 25.01 | 630.4 | | 57 | 64.94 | 588.3 | | 69 | 2,492.0 | 318 | |
| 48 | 24.96 | 631.3 | | 58 | 65.74 | 587.4 | | 610 | 2,492.4 | 294 | |
| 49 | 25.74 | 630.6 | | 59 | 61.52 | 592.0 | | 611 | 2,490.3 | 321 | |
| 410 | 25.24 | 630.9 | | 510 | 63.71 | 589.5 | | 612 | 2,489.6 | 322 | |
| 411 | 24.12 | 631.9 | | 511 | 62.91 | 590.5 | | 613 | 2,488.9 | 321 | |
| 412 | 25.69 | 630.2 | | 512 | 62.49 | 591.0 | | 614 | 2,488.4 | 320 | |
| 413 | 25.54 | 630.3 | | 513 | 62.68 | 590.7 | | | | | |
| 414 | 25.82 | 630.1 | | 514 | 68.68 | 584.1 | | | | | |
| STD DEV | 0.61 | 2.42% | | STD DEV | 1.90 | 2.87% | | STD DEV | 7.2 | 2.3% | |
| AVG AIR FLOW | 25.28 | | | AVG AIR FLOW | 64.10 | | | AVG | 316.8 | | |

EST FLOW (SCCM) AT 800 TORR= 40.19    EST FLOW (SCCM) AT 800 TORR= 116.1    EST FLOW (SCCM) AT 300 TORR= 2,241

|  |  |  |
|---|---|---|
| | 66* | 2,494.3 | 285 |
| | 64* | 2,491.8 | 315 |

*DISK WERE VISUAL DAMAGED WHEN INSPECTED

FIG. 12B

FLOW RESTRICTOR

RELATED APPLICATIONS

This application is a continuation of and claims benefit of priority under 35 U.S.C. §120 from U.S. Ser. No. 11/063,745, filed Feb. 24, 2005, now U.S. Pat. No. 7,431,045, which in turn claims priority under 35 U.S.C. 119(e) from U.S. Provisional Patent Application Ser. Nos. 60/548,109 filed Feb. 27, 2004, the disclosures of which application are incorporated herein by reference. U.S. Ser. No. 11/063,745 application is also a continuation-in-part of U.S. application Ser. No. 10/652,506, filed Aug. 28, 2003, now abandoned, by Daniel Mudd et al. titled "Higher accuracy pressure based flow controller," the contents of which are incorporated by reference.

FIELD

This disclosure teaches techniques related to flow restrictors which are used for flow rate measurement, for example, as part of a mass flow controller. The disclosed teachings help in providing a flow path in the flow restrictor that is clean and formed without variation in its performance.

BACKGROUND

1. Introduction

Flow restrictors are used in many applications including in mass flow controllers. Conventional flow restrictor consists of sintered alloy metal or a filter, in which their flow resistance cannot be controlled in the manufacture process against the allowable design value range in performance. A designer often needs to select a suitable flow restrictor from off the shelf manufactured ones to obtain proper flow restrictors. Furthermore, the flow restrictors can show a non-linear characteristics in use of flow measurement.

The conventional flow restrictors are built of sintered alloy metal or mesh-like elements. These flow restrictors are used as a buffer in flow pressure for flow control equipment. For example, flow meters could take advantage of the differential pressure and flow characteristics of the flow restrictors.

For this type of flow restrictors made of sintered alloy material, it is difficult to control the degree of porous density. Further, such products must be selected from off-the shelf manufactured products to obtain a certain specific range of flow resistance.

2. Problems in Conventional Sitntered Flow Restrictors

Sintered elements are believed to be not as clean as restrictor designs in thermal mass flow controllers.

The performance of the sintered elements often deteriorates at flows above 5 SLM. The sintered element restrictors lose a significant portion of the desirable non-linearity as the flow through it takes on a sonic (rather than laminar) characteristic. This is because of the increased hydraulic diameters used by the higher flow through flow restrictors.

The sintered elements often do not operate at lower inlet pressures to the mass flow controllers. This would necessitate a higher inlet pressure, which is often a barrier to wide spread acceptance in the existing market place. A lower pressure drop is therefore desired.

SUMMARY

The disclosed teachings provide techniques for overcoming some of the disadvantages and securing some of the advantages noted above in related art flow restrictors and mass flow controllers.

According to one aspect of the disclosed teachings, there is provided a flow restrictor with a first disk having at least one inlet and at least one outlet and a flow path and a second disk having no flow path. The first disk and the second disk being stacked together.

According to another aspect, there is provided a mass flow controller comprising with an input, an output, a flow path, a pressure transducer and the above flow restrictor.

Yet another aspect of the disclosed teachings is A method of manufacturing a flow restrictor comprising generating at least one flow path in a first disk. A second disk containing no flow paths is piled on the first disk.

BRIEF DESCRIPTION OF THE DRAWINGS

The above objectives and advantages of the disclosed teachings will become more apparent by describing in detail preferred embodiments thereof with reference to the attached drawings in which:

FIG. 5 shows a table depicting some possible example combination of restrictor types.

FIG. 9 illustrates the Flow Curve and Variability for a sintered element disk restrictor for comparison.

FIGS. 12A-B show restrictor to restrictor variation in the same flow category.

DETAILED DESCRIPTION

IV.A. Synopsis

The disclosed non-sintered flow restrictor has a flow path which is formed to correspond to the thickness of bright steel sheet. The flow path is formed by etching process. One such sheet with a flow path is overlayed with another sheet with no etching path. This kind of flow path elements are piled up like a sandwich to obtain a desired flow rate. The flow path element in disk shape is attached to the element without the flow path using diffusion bonding.

In an exemplary embodiment, the cross-sectional area of the flow path, also called as a window, is determined by the sheet thickness and the depth of etching in the sheet thickness. By decreasing or increasing the number of such windows, the adjustment of flow rate and differential pressure across the flow restrictor can be controlled. Further, change in the width of etching and sheet thickness can control the cross sectional area of the flow path.

Flow rate and differential pressure across the flow restrictor can also be controlled by increasing or decreasing the number of the etched sheets and sheet thickness.

Such a flow restrictor has a non-linear characteristics which allow its operation in the low flow rate range, resulting in decreasing the error in pressure measurement by pressure gauges that operate at low pressures.

Such a flow restrictor is applicable for all fluid materials, and is can be used in a various combination with pressure gauges for fluid flow measurement.

IV.B. Exemplary Embodiment

Figure 1A:
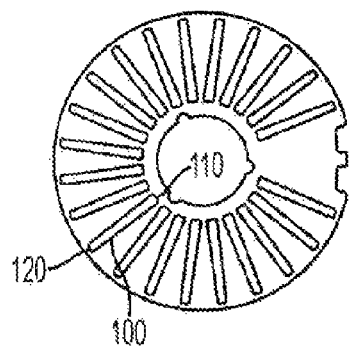
FIG. 1(a)-(c) shows an exemplary embodiment of the disks

An exemplary embodiment is shown in FIG. 1. The illustrated embodiment of the disclosed stacked disk restrictor is composed of flow disks and spacer disks. Flow disks have sections (for example section 100) of it completely etched through. These etched away sections are typically constant width and extend from an inner location 110 to an outer location 120.

Figure 1B:
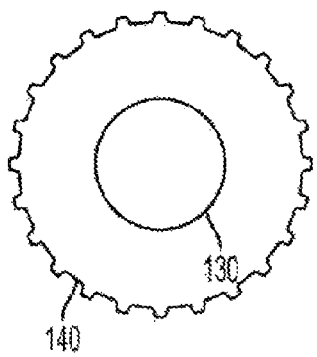
Figure 2:
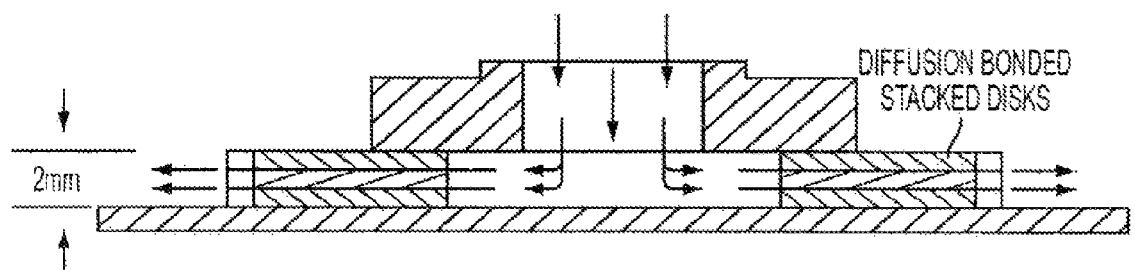
FIG. 2 shows an exemplary embodiment of the stacked disk restrictor.
Figure 3:
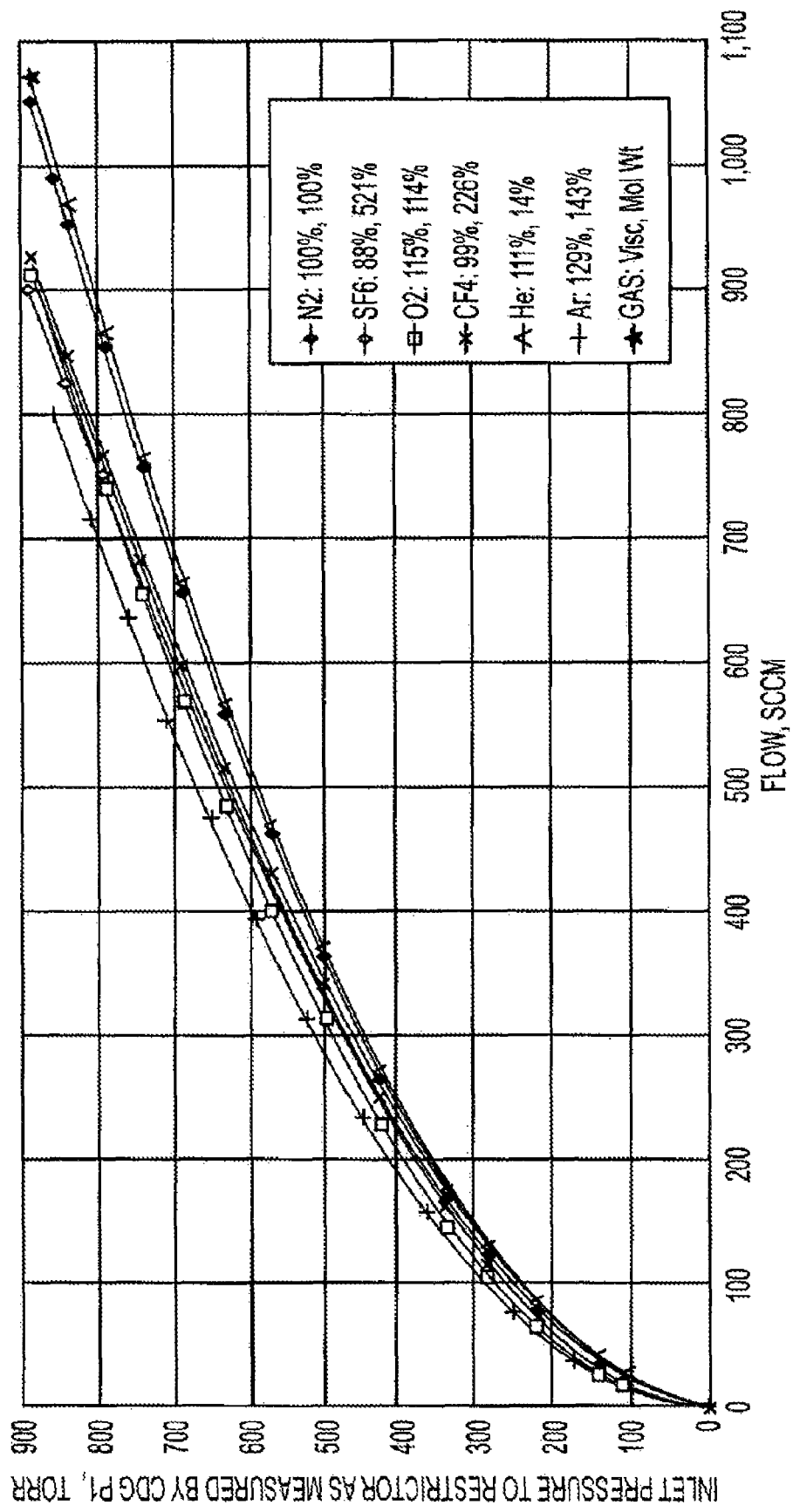
FIG. 3 shows a graph depicting flow data for an exemplary embodiment of an MFC with a stacked restrictor for six gases.

Spacer disks (FIG. 1(b)) do not have etched through sections. They are placed on either side of the flow disk as shown in FIG. 2. A flow path is formed by the etched section of the flow disk bounded by the spacer disk immediately above and below the flow disk. Spacer disk typically have an ID 130 that is larger than the beginning location of the flow path 110 and OD that is smaller than the ending location of the flow path 120 to allow gas to enter and exit the flow path.

Such through etched flow disk combined with spacer disks provides better control of the flow path hydraulic diameter. As a corollary better control is also achieved of variations from restrictor to restrictor.

Figure 1C:
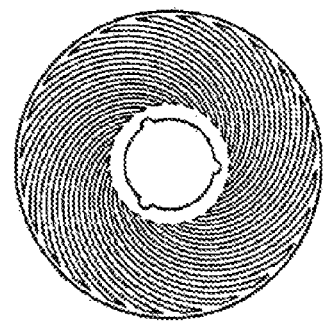

An alternative implementation is a flow disk with flow disks that are not linear in nature but rather follow a curved flow path as shown in FIG. 1(c). This could maximize the length of the flow path(s) given a limited diameter flow disk.

In yet another alternate embodiment, an optimal geometry where the flow path follows a pattern of an Archimedes spiral, (ie polar notation r=d alpha) is used.

In another embodiment dominantly compressible laminar flow is achieved causing the device to display the beneficial non-linearity. This allows a wider dynamic.

In an exemplary embodiment, a single flow path or multiple flow paths are layed out on a single disk. The flow paths may or may not be identical. The multiple disks are then stacked together with spacer disks alternating between flow disks. This provides a basis for the making of several different restrictors that span a large dynamic range. Such an available dynamic range reduces the needed calibration effort.

As noted above, multiple flow disks could be etched on a single sheet retained by small tabs. The sheets could include tooling holes common to both flow disks and spacer disks.

The flow disks and spacer disks are aligned by tooling pins to assure correct location of the disks relative to each other. The sheets are spot welded or held by other means to hold them in position until they are diffusion bonded together in proper relative location.

In alternate embodiments the disks could be held together by other means (for example, mechanical clamping) other than diffusion bonding.

Clamped mechanisms have fayed surfaces that outgas undesirable gases or dry down slowly. Diffusion bonding of the disks bonds the metal surfaces together avoiding the undesirable fayed surfaces.

Recommend disk over 0.002" thick could be annealed to minimize grain growth during process and disk below 0.002" could be 50% or more work hardened to improve stiffness of disks thereby improving handling.

Figure 4C:
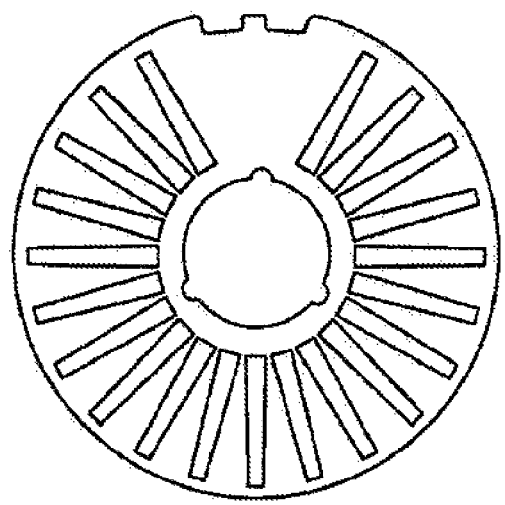
FIGS. 4A-4C show exemplary embodiments of three example flow disks.
Figure 4B:
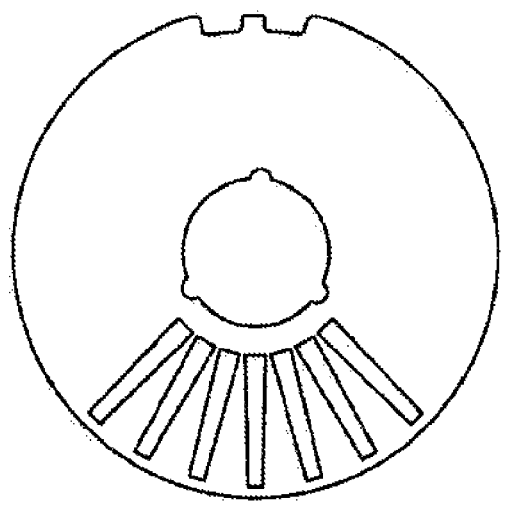
Figure 4A:
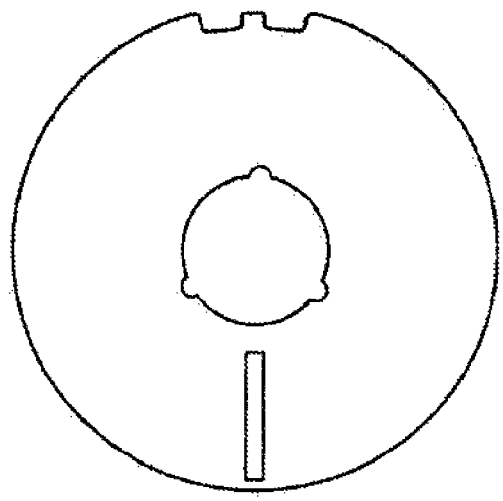

As noted above, the disk restrictor consists of flow disk alternately placed between spacer disks. Three example flow disks are shown in FIG. 4. They vary only in the number of flow paths on each disk. Disks F1.1, F1.8 and F1.22 are shown in FIGS. 4(a)-(c).

Depending on the desired flow rating of the restrictor 1 to three of these flow disk are included to build all the exemplary restrictors sizes 2,500 SCCM and below. In such an example configuration, smallest 40 SCCM restrictor will have 1 flow path while the 2,500 sccm restrictor will have 66 paths.

For higher flows more flow disks are stacked, the 10 SLM had 264 paths, but all restrictor stack 10 SLM down are 2 mm tall allowing interchangeability in the same MFC base.

FIG. 5 shows a table illustrating the type of example restrictors.

IV.C. Restrictor Non-Linearity

Such a restrictor design provides non-linear flow and also provides for compressible flow. In comparison, the laminar flow elements of thermal MFC are designed for small pressure drops where the pressure drop across the LFE is not significant compared to the line pressure. In such thermal MFCs, the gas density does not change significantly along its path and the flow can be considered incompressible.

In laminar flow, viscous forces dominate and are proportional to the shear velocity between the parallel flow lines. For incompressible flow, this proportional viscous relationship results in the simple familiar linear relationship between pressure drop and flow rate that are well known with standard thermal MFCs. For example, doubling the flow doubles the pressure drop across the element.

With compressible flow, this simple linear relationship no longer applies. However, the non-linear relationship between flow, inlet and exhaust pressure can be simulated with good results by combining simple incompressible flow theory with a finite difference methodology. Development of general governing equations is achieved by observing simulation results and applying engineering superposition of conditions to determine the effect of exhaust pressures.

The results of an analysis of an ideal laminar flow element under compressible flow are summarized below:

1. Mass flow into a vacuum equals a geometric constant times the square of the absolute inlet pressure.

$$M_{vac} = K_{Geo} * K_{gas\,prop=f(t)} * P^2_{inlet}$$

2. Mass flow into non vacuum conditions is a function of the square of the absolute inlet pressure and the ratio of the absolute exhaust pressure to the absolute inlet pressure. Specifically, the Non-Vacuum-Exhaust mass flow is reduced by the cosine of the arcsine of this pressure ratio.

$$M_{n\_vac} = M_{vac} * \cos(a\sin(P_{exh}/P_{inlet})) = K_{Geo} * P^2_{inlet} * \cos(a\sin(P_{exh}/P_{inlet}))$$

Flow curves obtained from test data on exemplary embodiments of the disk restrictor and the flow curves produced by numeric simulations relying solely on laminar theory supports the conclusion that flow through the disclosed restrictor is dominantly compressible laminar flow.

Figure 14:
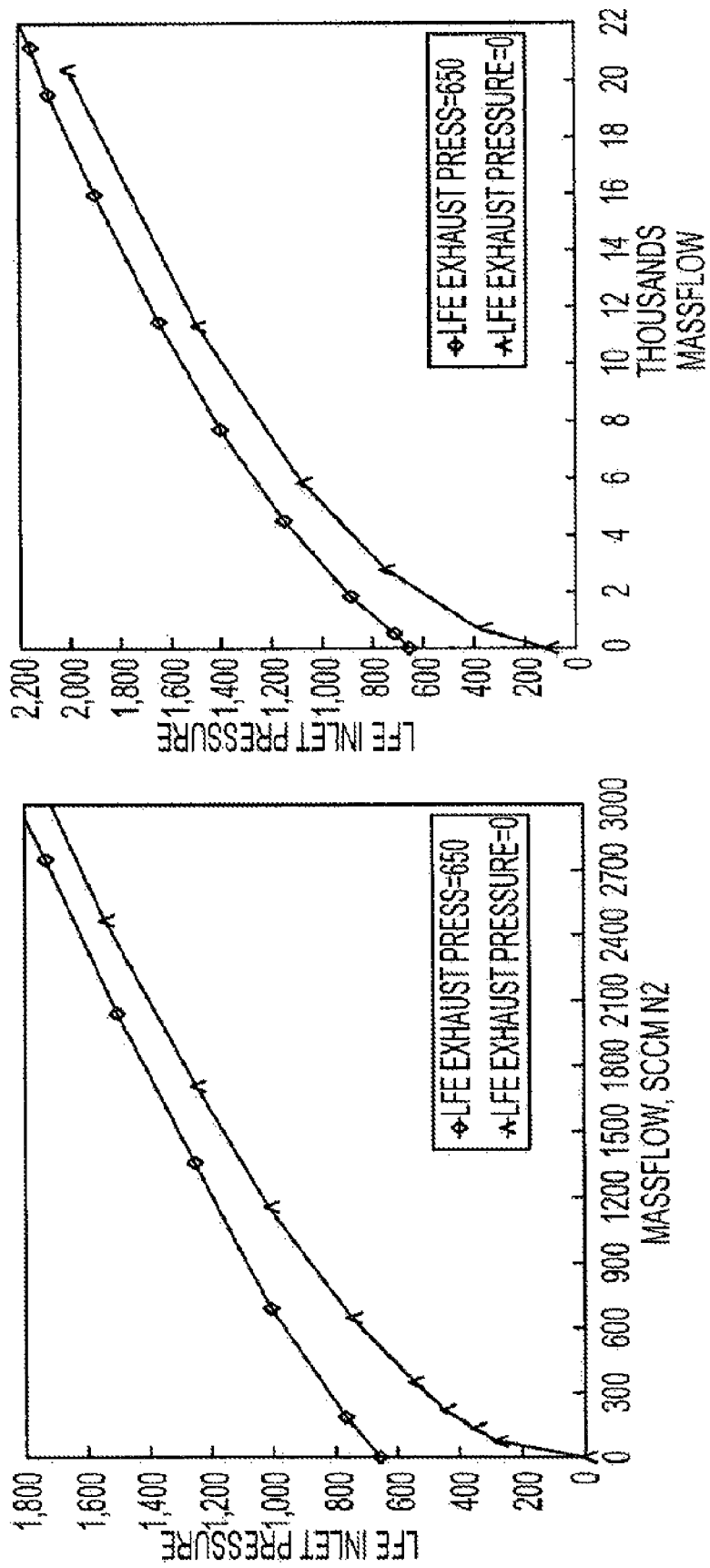
FIG. 14 shows two graphs depicting the test and simulation results for exemplary embodiments of the disclosed disk restrictors.
Figure 15:
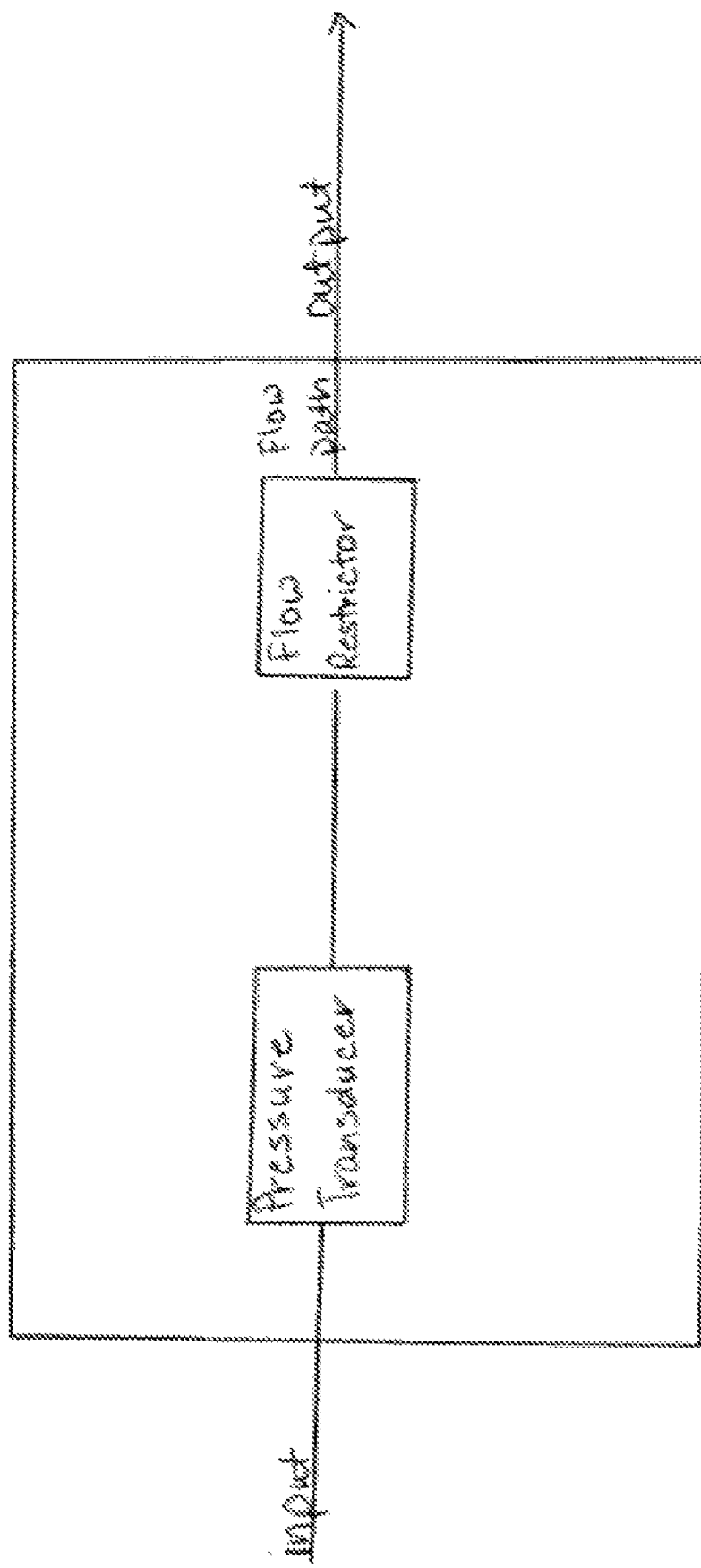
FIG. 15 shows a mass flow meter.

FIG. 14 shows two graphs depicting the test and simulation results for exemplary embodiments of the disclosed disk restrictors.

Although the dominant mechanism in disclosed disk restrictor is compressible laminar flow, secondary mechanisms exist and are responsible for deviations between the test data and simulations.

The actual data for the exemplary embodiment is best fit by the equation $$M_{vac} = K_{Geo} * P^{1.85}{}_{inlet}.\text{ as opposed to}$$

$$M_{vac} = K_{Geo} * P^{2.0}{}_{inlet}$$

This deviation from the ideal equation where the power term, is 1.85 instead of 2.0, is evidence of these mechanisms. Secondary mechanisms not accounted for in the simulation and general equation include:

1. Laminar flow takes a finite distance to fully develop upon entering an LFE. Previous work in the art suggests that laminar flow is not fully developed in a LFE until a distance of 50 hydraulic diameters from the inlet.

2. Even though the Reynolds indicates that gas flow is deeply in the laminar regime, localized disturbances can cause additional parasitic kinetic loses when the potential kinetic energy, a ($\frac{1}{2}$)mV$^2$ term, due to gas velocity becomes significant. (Additional details may be found in U.S. Patents by Drexel) In such cases, the authors conjecture that this additional kinetic loss to be the cause of the modest deviation in the flow curves of SF6 and CF4 from being scalar multiples (determined solely by relative viscosity) of the lighter gas flow curves as seen below. To account for this effect, a kinetic loss term may be added to the existing simulation to approximate this effect.

3. Finally, laminar flow assumptions begin to deteriorate when the line pressure in a section of the LFE reduces to the point when the mean free path of the gas becomes a significant portion of the hydraulic diameter of the flow path. In such situations, mass flow is reduced compared to pure laminar theory. Estimates of this flow reduction exist and are typically keyed to the ratio of the mean free path of a gas to the hydraulic diameter of the flow path. As such, molecular flow influences might be added to the existing simulation.

If one increases the L/D ratio of a flow path, the laminar forces increase relative to the secondary non-laminar effects. To the extent that the design package size and part cost allow one should maximize this ratio to achieve a restrictor who's performance more closely approaches the ideal laminar flow element.

If one designs the geometry of a restrictor such that it maintain largely laminar flow even at the higher pressure drop of compressible flow one can take advantage of a non-linear flow curve. With this beneficial non-linearity one can develop an mass flow controller which displays a % of Reading Error characteristic as opposed to a % of Full Scale Error characteristic as displayed by thermal MFCs.

The relatively small effective (hydraulic) diameter and long length of the flow paths result in laminar flow which can be maintained even at the higher pressure drops associated with compressible gas flow.

The laminar flow elements of thermal MFC are designed for small pressure drops where the pressure drop across is small compared to line pressure of the restrictor and gas flow can be considered incompressible in such thermal MFCs.

The disclosed structure, however, intentionally promotes compressible flow. As a result of the designs locating the restrictor down-stream of the MFC control valve and exhausting the MFC to vacuum, the pressure drop across the laminar flow element is equal to a large percentage if not 100% of the restrictor's absolute upstream pressure.

To maintain laminar flow with these higher pressure drops requires the effective diameter of the flow path of the compressible laminar flow restrictor to be much smaller than the diameters seen in thermal MFC restrictor designs. The disclosed disk restrictor accomplish this task.

For incompressible laminar flow:

Mass flow, m, equals volumetric flow, Q, times density, r, and is also proportional to pressure drop, dP $$M = Q * r$$

Density is inversely proportional to absolute pressure, $P_{abs}$, of the Gas $$r \sim 1/P_{abs}$$

Pressure drop is proportional to volumetric flow times absolute viscosity, m:

$$dP \sim Q * h \text{ therefore } Q \sim dP/m$$

One can substitute and combine terms to obtain:

$$M = K\, dP/m * 1/P_{abs} = K/m * dP/P_{abs}$$

Given that viscosity varies little with pressure and may be considered fixed for a given gas, mass flow becomes proportional to pressure drop and inversely proportional to line pressure.

As and example, for a fixed mass flow the result of reducing the absolute line pressure of the flow would double the pressure drop across the restrictor.

To mentally investigate the characteristics of incompressible laminar flow one can consider compressible flow as a series of incompressible flows in series with the outlet of each successive section the inlet of the next. Also assume the laminar flow element is exhausting to vacuum.

In this case the average line pressure of the series of restrictor sections decreases as the inlet pressure to the restrictor is reduced. As a result the effective line pressure to the restrictor drops, causing the incremental pressure drop per sccm to increase for the series. This result correlates well with the observed flow characteristics of the disclosed disk restrictors where the slope, torr/sccm, of the flow curve is proportional to the value of the absolute inlet pressure of the restrictor.

IV.D. Test Results

Figure 6:
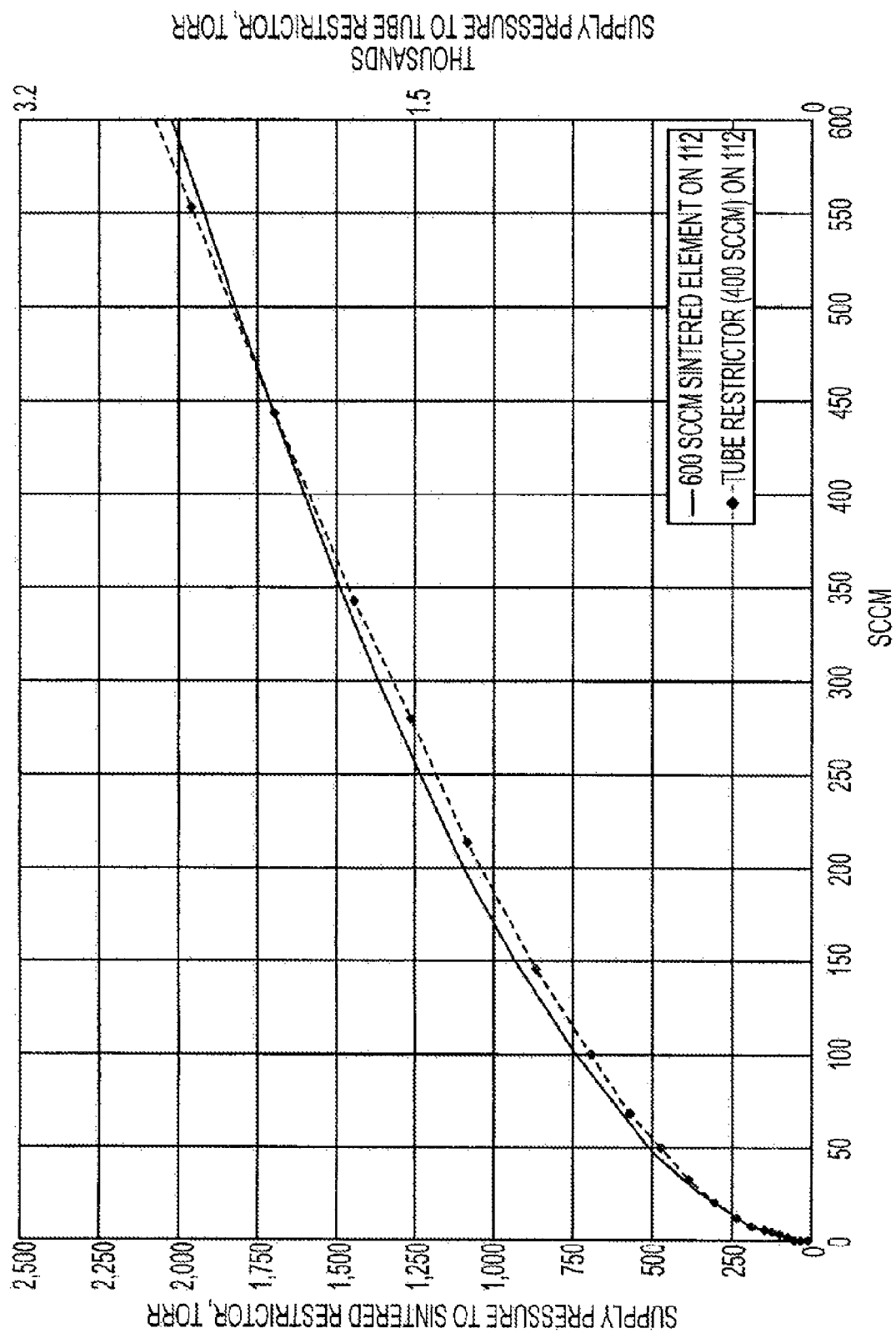
FIG. 6. shows data for a porous metal restrictor and a tube restrictor for comparison.

An example disk flow restrictor with a small enough diameter was designed to ensure laminar flow with high pressure drops exhausting to vacuum. The restrictors was placed into a MFC and the flow performance of the restrictor was studied. FIG. 6. shows data for a porous metal restrictor and a tube restrictor for comparison. Restrictor Disk was tested for the beneficial non-linearity, flow rate and variability before and after diffusion bonding.

Figure 7:
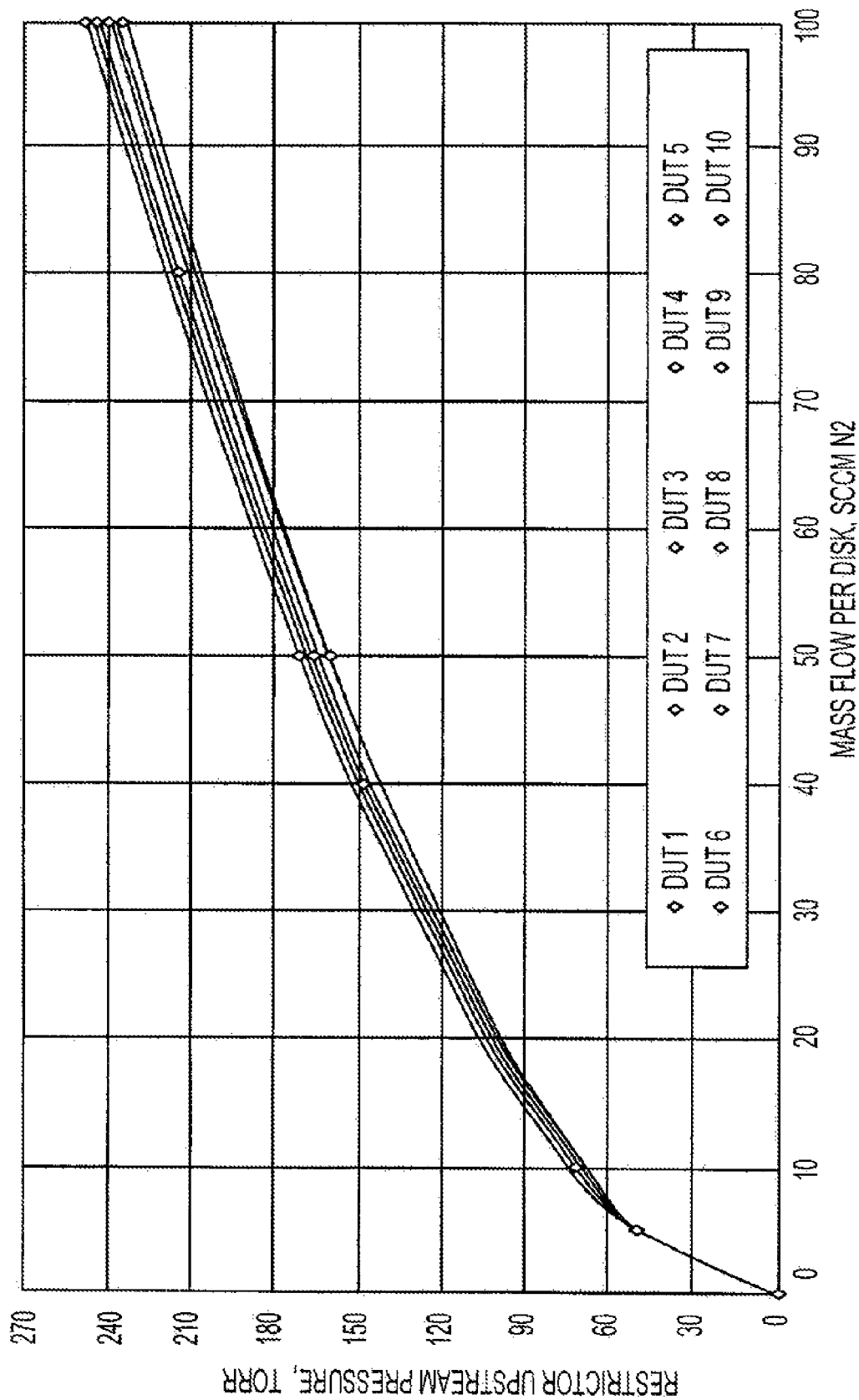
FIG. 7 illustrates the flow non-linearity and variability of 10 pieces of the example F1_24 disks before diffusion bonding.

FIG. 7 illustrates the flow non-linearity and variability of 10 pieces of the F1__24 disk before diffusion bonding.

Figure 8A:
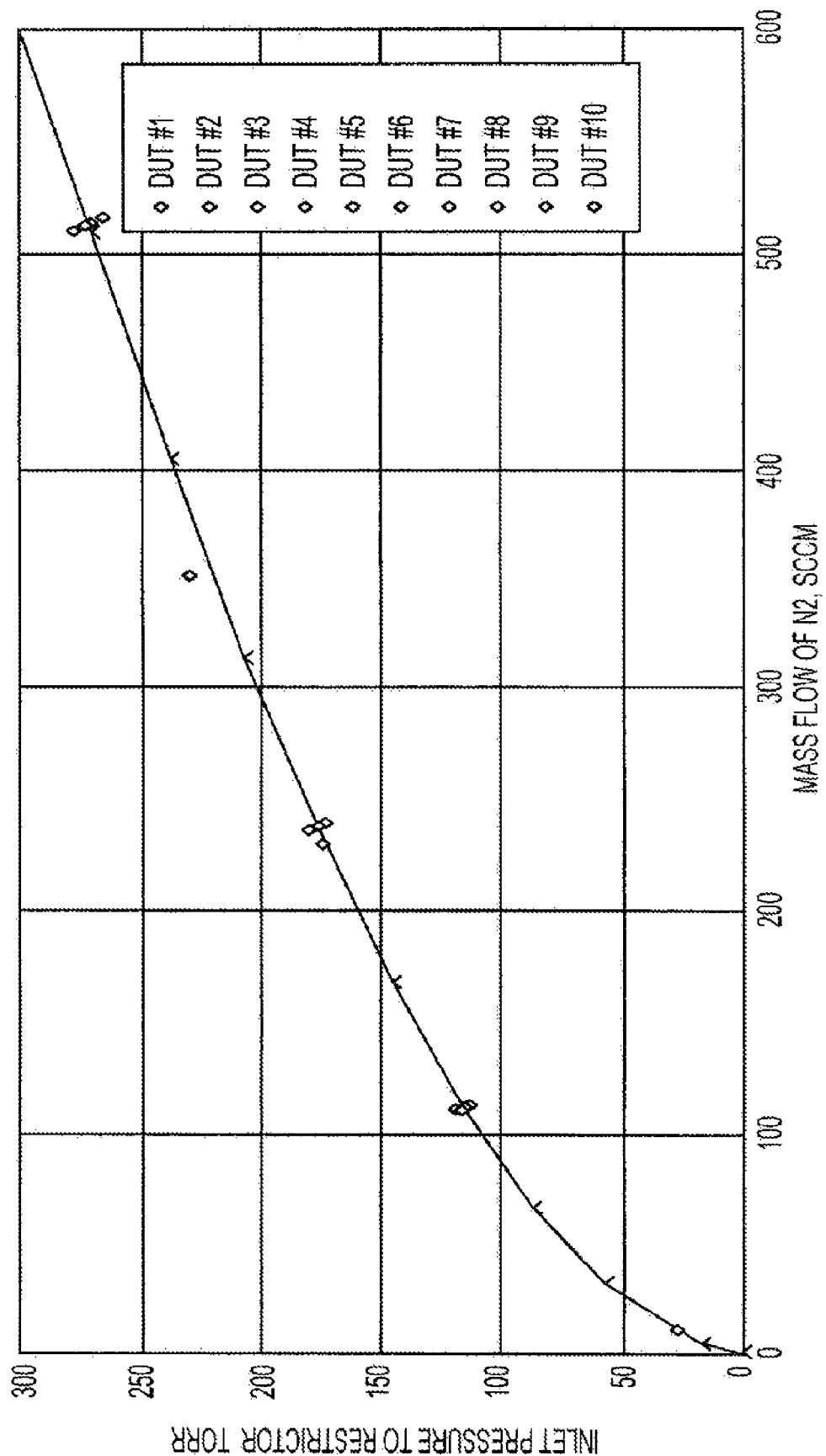
FIG. 8A illustrates the non-linearity and variability of another type of disk prior to diffusion bonding.

Similarly FIG. 8A illustrates the non-linearity and variability of another type of disk prior to diffusion bonding.

Figure 8B:
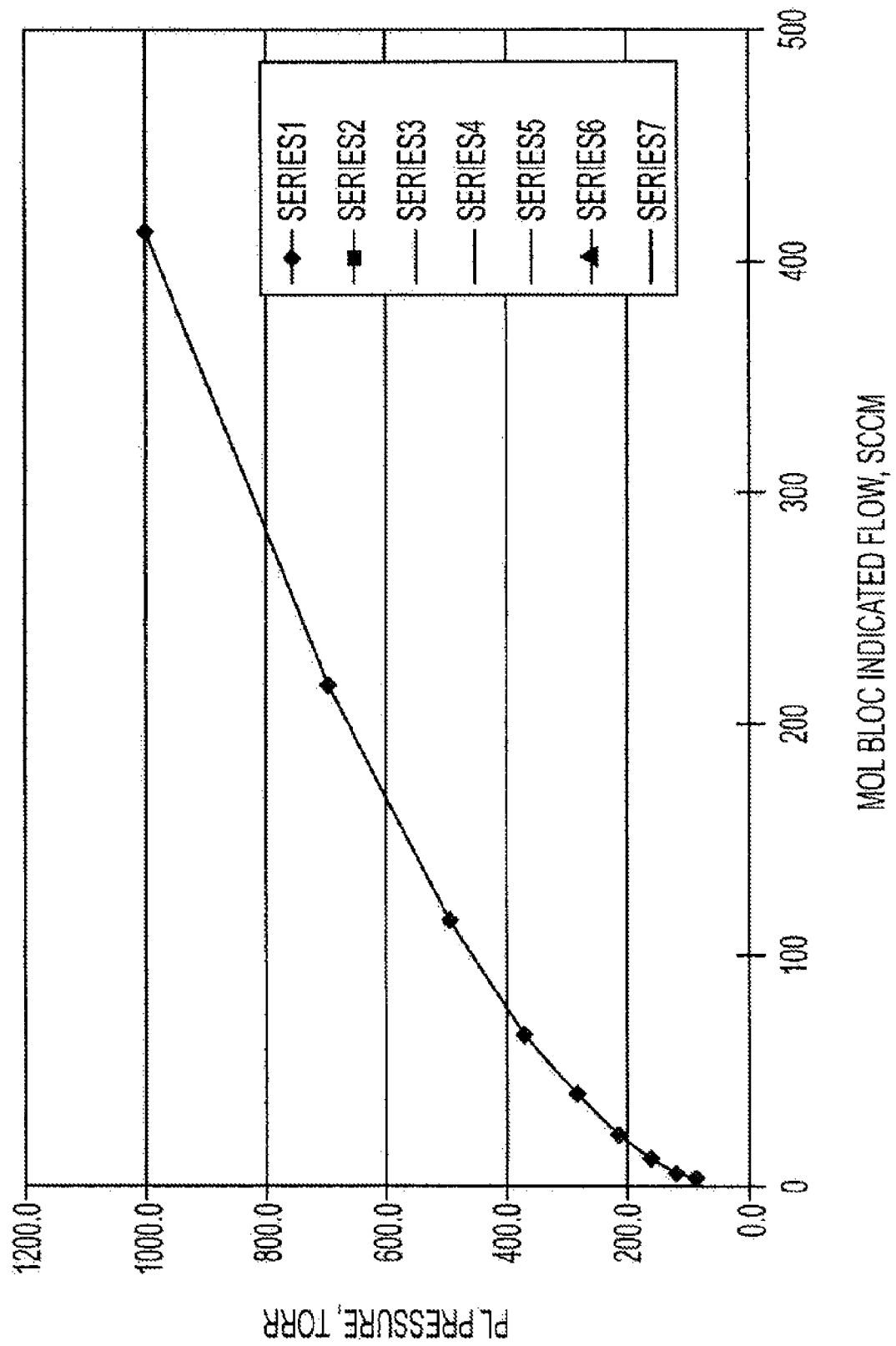
FIG. 8B shows data from another exemplary embodiment of the #2 disk where the performance is significantly improved to within 1% reading band.

Likewise, FIG. 8B shows data from another exemplary embodiment of the #2 disk where the performance is significantly improved to within 1% of reading band.

FIG. 9 illustrates the Flow Curve and Variability for a sintered element disk restrictor for comparison.

Figure 10:
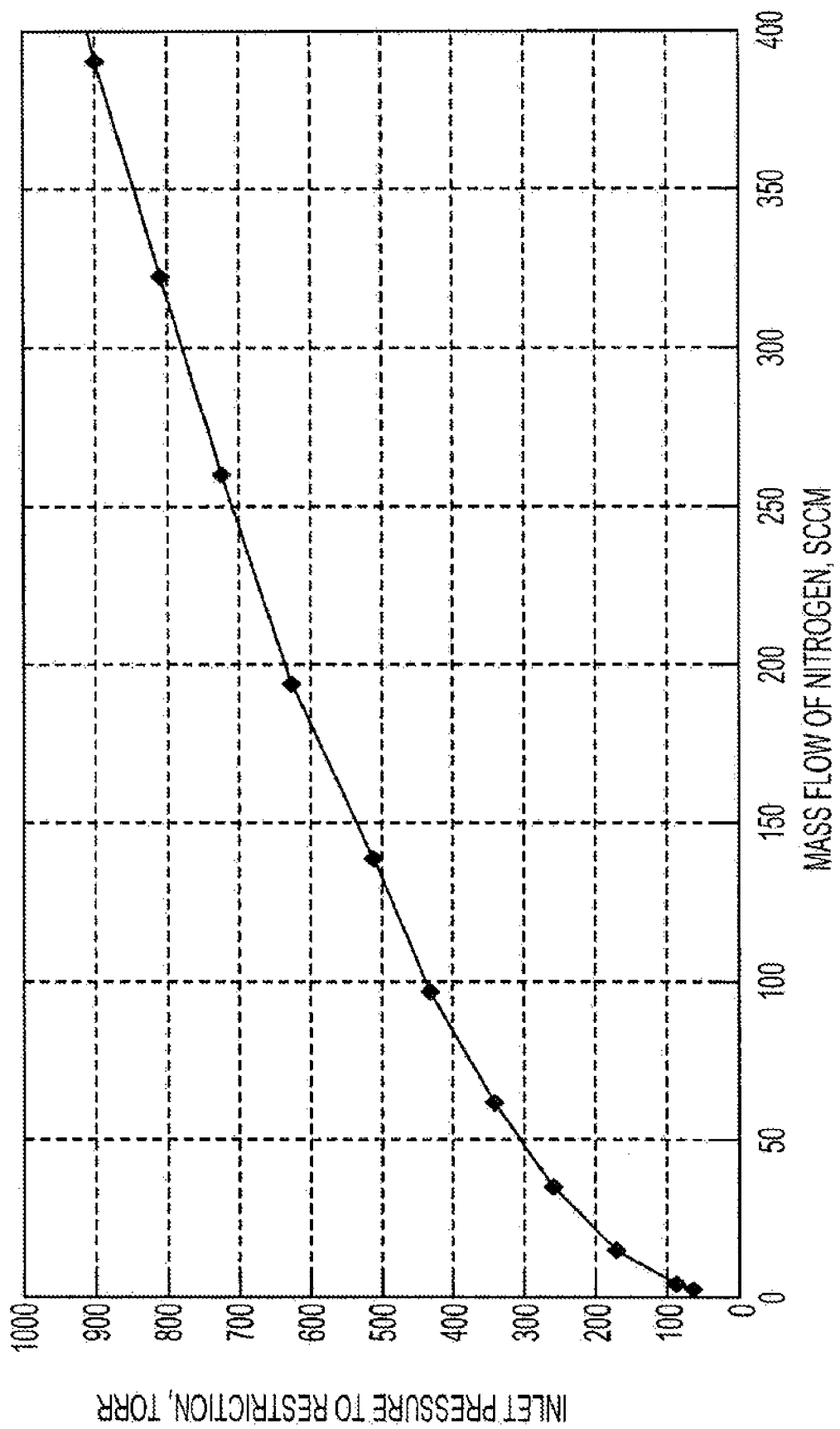
FIG. 10 illustrates the post diffusion bonding of a 300 SCCM restrictor.

FIG. 10 illustrates the post diffusion bonding of a 300 SCCM restrictor. As can be seen the target pressure drop and non-linearity is good.

Figure 11:
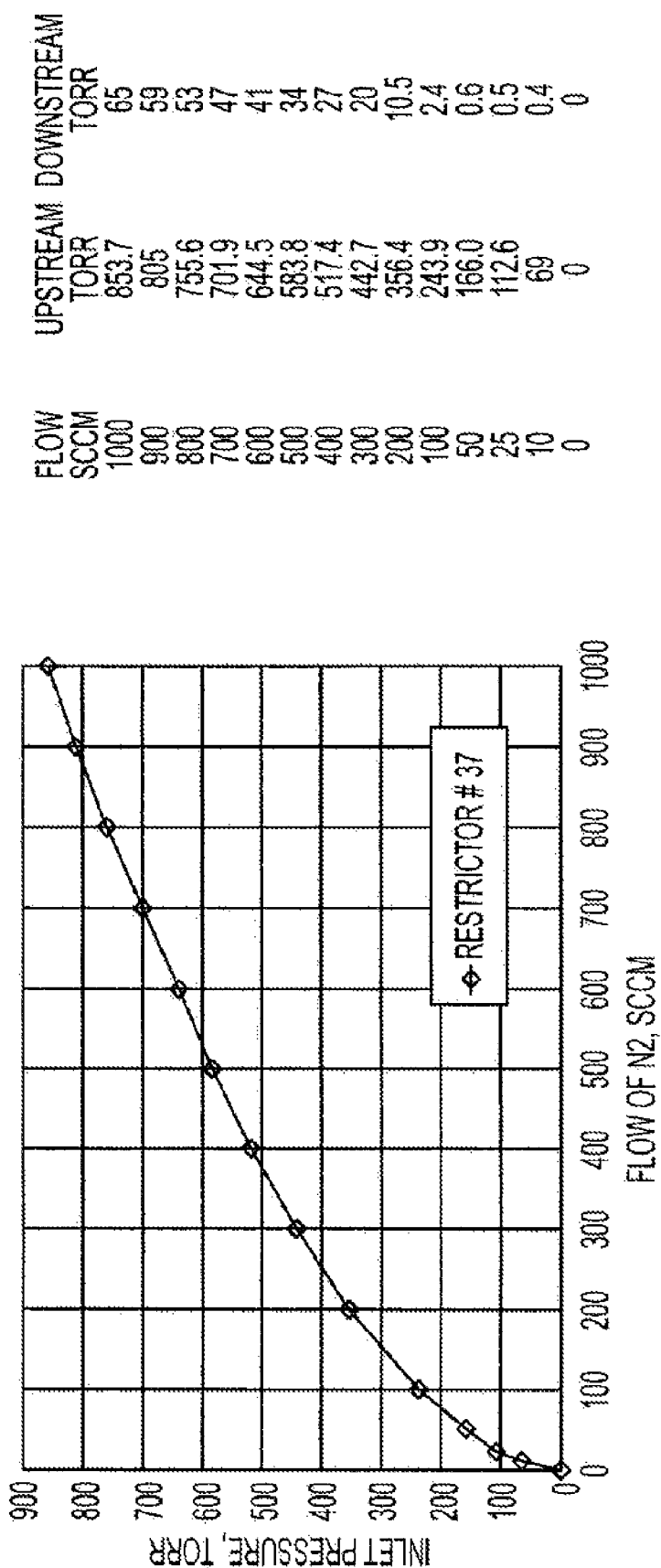
FIG. 11 illustrates the post diffusion bonding of a 900 SCCM restrictor, 3 pieces of 300 sccm disk stacked in the restrictor.

Similarly FIG. 11 illustrates the post diffusion bonding of a 900 SCCM restrictor, 3 pieces of 300 sccm disk stacked in the restrictor. This illustrates that vertical stacking does not significantly affect the flow through the restrictor now that press during bonding had been reduced to 500 pounds.

Restrictor to restrictor variation in the same flow category is illustrated for 6 of the 8 restrictor categories in FIGS. 12A and 12B. A simple 1-point test was used as testing diffusion bonded restrictors.

As can be seen the standard deviation within a restrictor category is roughly 3% in all 6 categories tested.

As one final test, a mass flow controller was built using a 900 sccm restrictor and run on 6 gases with the same calibration and set points. The flow curves for each gas were collected by queering the MFC for the value of the upstream CDGs pressure reading while exhausting to vacuum. A Mol Bloc was placed in series with the MFC and used as a flow reference. The intent was to verify that the anticipated gas to gas variation over a wide variety of gases would still remain roughly ±20% as anticipated from laminar theory.

Figure 13:
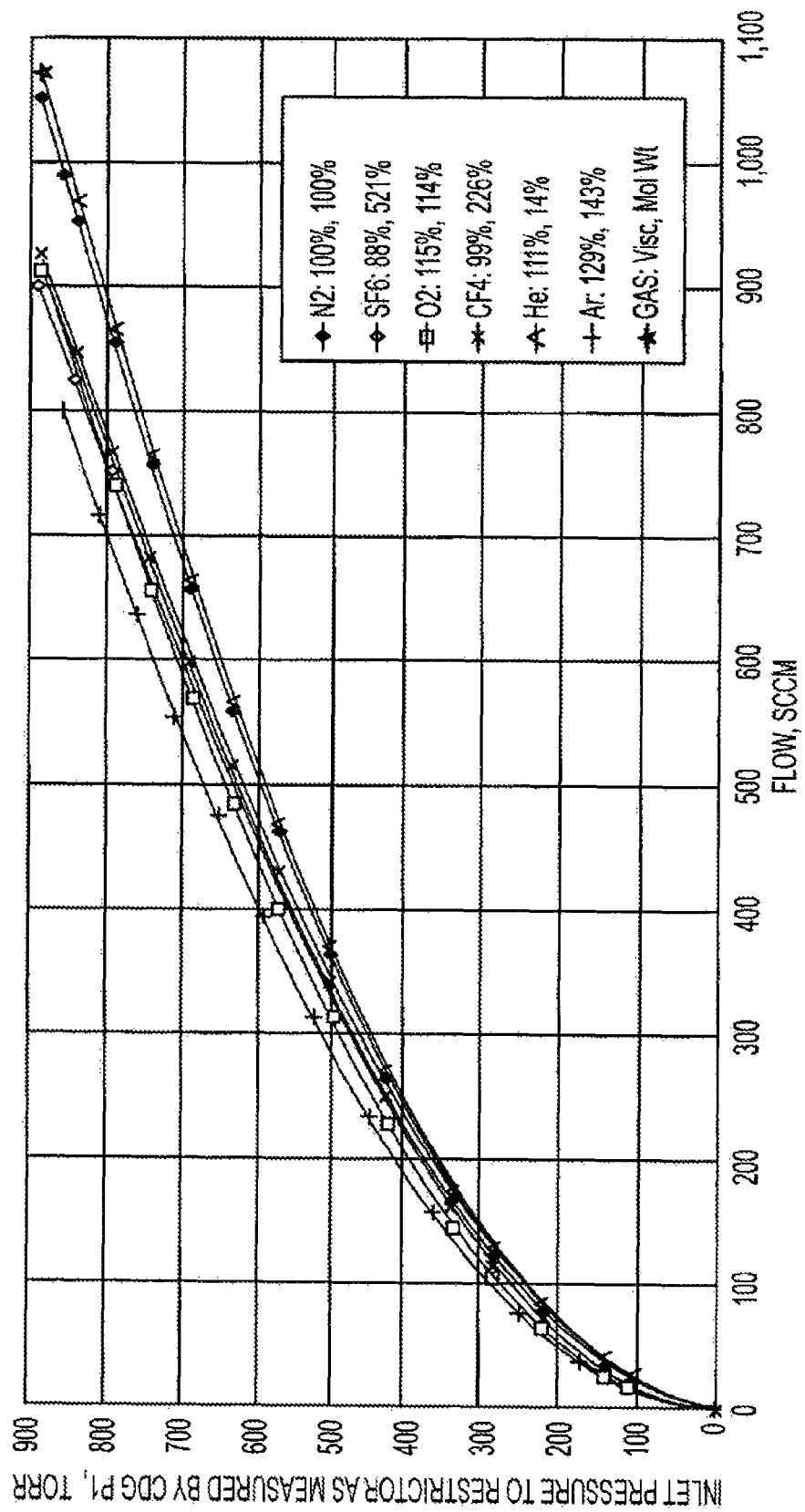
FIG. 13 shows results of a where a mass flow controller was built using a 900 sccm restrictor and run on 6 gases with the same calibration and set points.

The results are shown in FIG. 13.

As can be seen the variation between markedly different gas types is small as expected and the beneficial non-linearity is present in all cases.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A flow restrictor comprising:
   a first disk having a at least one inlet and at least one outlet and a flow path connecting the inlet and the outlet
   a second disk having no flow path,
   a plurality of first disks and a plurality of second disks being piled up alternatively to have a laminate structure,
   the first disk and the second disk being non-sintered metals,
   a through hole formed in the first disk providing the inlet, the outlet and the flow path, and
   a cross-sectional area of the flow path being adjustable based on a thickness of the first disk.

2. The flow restrictor of claim 1, further comprising a number of flow paths, the number being determinative of a desired flow rate.

3. The flow restrictor of claim 1, wherein the flow path is formed by etching.

4. The flow restrictor of claim 3, wherein the flow path is etched through.

5. The flow restrictor of claim 1, wherein a cross-sectional area of the flow path is determined based on a desired flow rate.

6. The flow restrictor of claim 1, wherein a number of first disks and a number of second disks is determined based on a flow rate.

7. The flow restrictor of claim 1, wherein a cross-sectional area of the flow path is constant.

8. The flow restrictor of claim 1, wherein the flow path is in a straight line.

9. The flow restrictor of claim 1, wherein the flow path is curved.

10. The flow restrictor of claim 9, wherein a centerline of the flow path is an Archimedean spiral.

11. The flow restrictor of claim 1, wherein the first disk and the second disk are circular in shape.

12. The flow restrictor of claim 1, wherein a fluid flow through the flow restrictor is compressible.

13. The flow restrictor of claim 1, wherein a fluid flow through the flow restrictor is non-linear.

* * * * *